June 14, 1966   R. PLAZIBAT   3,255,543
DOOR GUARD
Filed June 1, 1965

INVENTOR
ROBERT PLAZIBAT
BY Cullen, Sloman & Cantor
ATTORNEYS

United States Patent Office 3,255,543
Patented June 14, 1966

3,255,543
DOOR GUARD
Robert Plazibat, 26273 Meadowview Drive,
Farmington, Mich.
Filed June 1, 1965, Ser. No. 460,061
2 Claims. (Cl. 40—129)

This invention relates to a door guard, and more particularly to a protective sheet which may be suspended from the handle of an automobile door for protecting the door against scratches and contact with the doors of adjacent automobiles.

In parking lots, the spaces between adjacent automobiles are usually relatively small. Thus, opening of the door of one automobile frequently causes that door to strike a portion of the door of the next adjacent automobile, thereby scratching or damaging same.

Hence, it is an object of this invention to protect automobiles in parking lots by providing a protective sheet or door guard for each automobile to protect it from being scratched, dented or damaged due to being struck by the opening door of the next adjacent automobile.

A further object of this invention is to provide a door guard in the form of a protective, relatively stiff sheet, formed of a cardboard or cardboard-like material, which is arranged to be suspended from the handle of the automobile door and which may be provided with advertising upon its exposed face, so as to encourage distribution of such door guards by advertisers, and wherein the means for suspending this sheet from the door handle is so formed as to expose the advertising surface of the sheet.

These and other objects and advantages of this invention will become apparent upon reading the following description, of which the attached drawings form a part.

Figure 1:
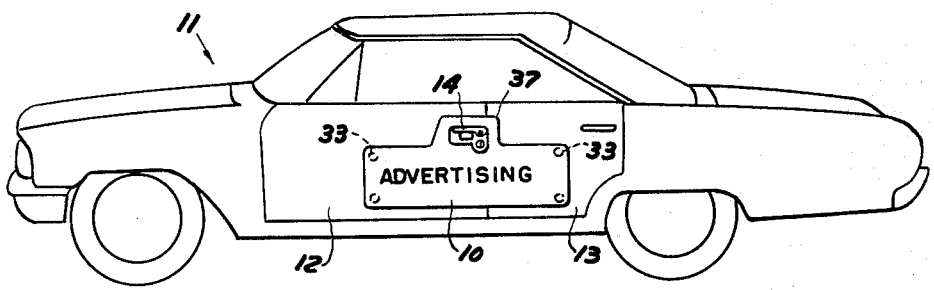
FIG. 1 is an elevational view of an automobile with the door guard secured thereto.
Figure 2:
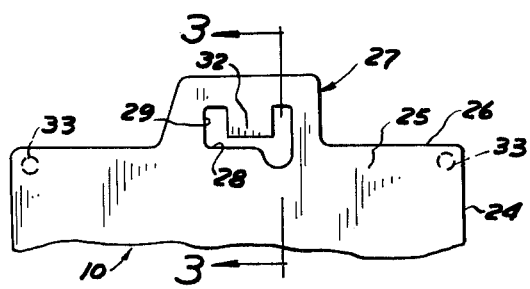
FIG. 2 is an enlarged elevational view of the upper portion of the door guard, including the fastening means.
Figure 3:
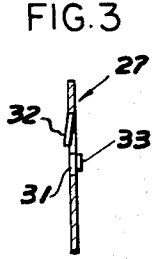
FIG. 3 is a cross-sectional view taken in the direction of arrows 3—3 of FIG. 2.

FIG. 1 illustrates the door guard 10 mounted upon an automobile 11 having a front door 12, a rear door 13 and a front door handle 14 located adjacent the vertical edge 15 of the front door. The door handle, which is conventional, is formed in a U-shape having a handle base 16, a forward, narrow leg 17 and a rear, wide leg 18, with the legs being secured to the door, and with a button type opener 19 located in the wide leg 18. Below the wide leg is located the conventional key lock 20.

The door guard is formed of a large, vertically arranged sheet 24 which may be formed of cardboard, heavy paper which is stiff, or plastic sheet or the like, all being a cardboard-like material, that is, being relatively stiff. One face 25 of the sheet 24 is formed as an exposed face upon which advertising may be imprinted.

The upper edge 26 of the sheet is provided with a centrally located mounting extension 27 which is arranged to hook over and secure to the door handle. To this end the extension is provided with a horizontal slot 28, of a size to receive the base 16 of the door handle, with upwardly extending, approximately vertical slots 29 and 30 formed at the opposite ends of the horizontal slot. The slot 29 is of a width to closely receive the narrow leg of the handle and the slot 30 is of a width to receive closely the wide leg of the handle.

In addition, the lower edge defining the horizontal slot 28 is provided with a cutaway, relief portion 31 to expose the key lock 20.

In operation, the sheet is arranged alongside the automobile door and the handle 14 is inserted through the horizontal slot 28 and the sheet is then dropped downwardly so that the legs of the handle snugly fit within their respective vertical slots. The material between the vertical slots forms a tongue 32 which closely fits between the legs of the handle to snugly retain the extension in a hook-like fashion upon the handle.

Figure 4:
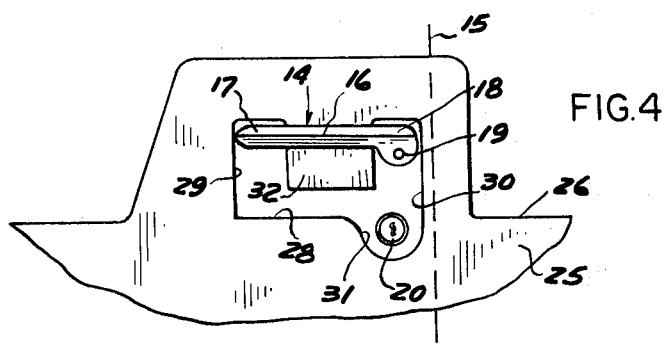
FIG. 4 is a view similar to FIG. 2, but showing the door guard mounted upon a conventional automobile door handle.
Figure 5:
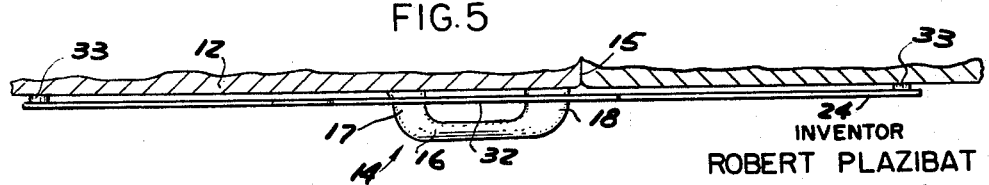
FIG. 5 is a plan view taken in the direction of arrows 5—5 of FIG. 4.

In this position, as shown in FIG. 4, the extension is snugly hooked over and frictionally held upon the door handle with the door lock 20 exposed. As shown in FIG. 1, the advertising imprinted face of the sheet is exposed, and the sheet covers a substantial portion of the door, as well as the vertical edge 15 of the front door. This protects the door against damage due to being struck by the door of the next adjacent automobile, as well as if it strikes the next adjacent automobile.

To further secure the sheet upon the door, magnets 33 may be adhesively secured to the corners of the sheet to thus magnetically secure these corners to the sheet metal body of the automobile.

This invention may be further developed within the scope of the following claims. Accordingly, it is desired that the foregoing description be read as being merely illustrative of an operative embodiment of this invention, and not in a strictly limited sense.

Now having described one operative embodiment of this invention, I now claim:

1. A door guard for an automobile having a door and a U-shaped door handle extending horizontally outwardly of the door, the door handle having two legs and a base interconnecting the two legs with the legs of the U-shape being secured to the door, and the handle being located near one vertical edge of the door, with one leg of the handle being wider in a horizontal direction than the other leg and with a door lock in the door and located beneath the wider of the two legs; comprising, a vertically arranged stiff sheet of cardboard like material having an upper edge and exposed face upon which advertising may be imprinted; a fastening means in the form of a narrow, upwardly directed, integral extension of the sheet, located centrally of said upper edge; said extension having a horizontal slot of a size to receive the base of the U-shaped handle and an upwardly extending, vertical slot formed at each end of the horizontal slot, with one of the vertical slots being of a width to receive the wider of the handle legs and the other vertical slot being of a width to receive the narrower of the handle legs, and with a downwardly extending tongue thus being formed between the vertical slots and the horizontal slot, the tongue being of a width to snugly fit betwen the legs of the handle closely adjacent to the door; said fastening means permitting the door guard to lie substantially flush against the outside of the door; and said sheet being of a size to cover a substantial portion of the door and said vertical edge of the door.

2. A construction as defined in claim 1 and wherein the lower edge defining the horizontal slot is downwardly recessed beneath the wider of the two vertical slots for exposing the door lock.

References Cited by the Examiner
UNITED STATES PATENTS

| | | | |
|---|---|---|---|
| 1,272,394 | 7/1918 | Devney | 40—128 |
| 2,166,048 | 7/1939 | Fritsch | 40—129 |
| 2,733,474 | 2/1956 | Capitani | 296—44.6 |
| 2,977,082 | 3/1961 | Harris | 40—142 X |

EUGENE R. CAPOZIO, Primary Examiner.
SHELDON M. BENDER, Assistant Examiner.